United States Patent
Dong et al.

(10) Patent No.: US 9,900,250 B2
(45) Date of Patent: Feb. 20, 2018

(54) SCALABLE HANDLING OF BGP ROUTE INFORMATION IN VXLAN WITH EVPN CONTROL PLANE

(71) Applicant: CISCO TECHNOLOGY, INC., San Jose, CA (US)

(72) Inventors: Liqin Dong, San Jose, CA (US); Yibin Yang, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 195 days.

(21) Appl. No.: 14/670,185

(22) Filed: Mar. 26, 2015

(65) Prior Publication Data

US 2016/0285760 A1    Sep. 29, 2016

(51) Int. Cl.
- *H04L 12/28* (2006.01)
- *H04L 12/741* (2013.01)
- *H04L 12/46* (2006.01)
- *H04L 12/713* (2013.01)
- *H04L 12/931* (2013.01)

(52) U.S. Cl.
CPC ........ *H04L 45/745* (2013.01); *H04L 12/4641* (2013.01); *H04L 12/4666* (2013.01); *H04L 45/586* (2013.01); *H04L 49/354* (2013.01)

(58) Field of Classification Search
CPC combination set(s) only.
See application file for complete search history.

(56) References Cited

U.S. PATENT DOCUMENTS 9,614,763 B2 *  4/2017  Dong ................. H04L 12/4666
2013/0003737 A1  1/2013  Sinicrope 2014/0086253 A1   3/2014  Yong
2014/0112122 A1   4/2014  Kapadia
2014/0348166 A1  11/2014  Yang
(Continued)

FOREIGN PATENT DOCUMENTS

WO    WO 16003489 A1 *  12/2014

OTHER PUBLICATIONS

WO 16003489 A1.*
Sajassi, et al., "Integrated Routing and Bridging in EVPN," L2VPN Workgroup, Nov. 11, 2014, 26 pages; http://tools.ietf.org/pdf/draft-ietf-bess-evpn-inter-subnet-forwarding-00.pdf.
(Continued)

*Primary Examiner* — Yemane Mesfin
*Assistant Examiner* — Mon Cheri Davenport
(74) *Attorney, Agent, or Firm* — Polsinelli PC (57) ABSTRACT

A method for programming a MAC address table by a first leaf node in a network comprising a plurality of leaf nodes is provided. Each leaf node comprises one or more Virtual Tunnel End Points ("VTEPs") and instantiates a plurality of Virtual Routing and Forwarding elements ("VRFs"), with a corresponding Bridge Domain ("BD") assigned to each VRF. The method includes obtaining information indicating one or more VTEP Affinity Groups (VAGs), each VAG comprising an identification of one VTEP per leaf node, obtaining information indicating assignment of each VRF to one of the VAGs, assigning each VAG to a unique Filtering Identifier ("FID"), thereby generating one or more FIDs, and programming the MAC address table, using FIDs instead of BDs, by populating the MAC address table with a plurality of entries, each entry comprising a unique combination of a FID and a MAC address of a leaf node.

19 Claims, 5 Drawing Sheets

(56) References Cited

U.S. PATENT DOCUMENTS

| | | | |
|---|---|---|---|
| 2014/0355450 A1* | 12/2014 | Bhikkaji | H04L 47/125 370/237 |
| 2015/0003450 A1 | 1/2015 | Salam et al. | |
| 2015/0003458 A1 | 1/2015 | Li et al. | |
| 2015/0003463 A1 | 1/2015 | Li et al. | |
| 2015/0010001 A1 | 1/2015 | Duda et al. | |
| 2015/0016461 A1 | 1/2015 | Qiang | |
| 2015/0030024 A1 | 1/2015 | Venkataswami et al. | |
| 2015/0053353 A1 | 3/2015 | Kapadia et al. | |
| 2015/0180672 A1 | 6/2015 | Kuwata | |
| 2015/0281067 A1* | 10/2015 | Wu | H04L 61/103 370/392 |
| 2015/0379150 A1* | 12/2015 | Duda | G06F 17/30876 707/736 |
| 2016/0087885 A1 | 3/2016 | Tripathi | |
| 2016/0274926 A1 | 9/2016 | Narasimhamurthy | |

OTHER PUBLICATIONS

Sajassi, et al., "A Network Virtualization Overlay Solution using EVPN," L2VPN Workgroup, Nov. 10, 2014, 24 pages; http://tools.ietf.org/pdf/draft-ietf-bess-evpn-overlay-00.pdf.

Sajassi, et al., "BGP MPLS Based Ethernet VPN," Network Working Group, Oct. 18, 2014, 52 pages.

Mahalingam, et al., "Virtual eXtensible Local Area Network (VXLAN): A Framework for Overlaying Virtualized Layer 2 Networks over Layer 3 Networks," Independent Submission, RFC 7348, Aug. 2014, 22 pages; http://www.hjp.at/doc/rfc/rfc7348.html.

USPTO Sep. 23, 2016 Non-Final Office Action from U.S. Appl. No. 14/674,900.

PCT Aug. 17, 2016 International Search Report and Written Opinion from International Application Serial No. PCT/US2016/023955; 17 pages.

USPTO Dec. 6, 2016 Notice of Allowance from U.S. Appl. No. 14/674,900.

* cited by examiner

SCALABLE HANDLING OF BGP ROUTE INFORMATION IN VXLAN WITH EVPN CONTROL PLANE

TECHNICAL FIELD

This disclosure relates in general to the field of computer networking and, more particularly, to techniques for scalable handling of Border Gateway Protocol ("BGP") route information in a Virtual eXtensible Local Area Network ("VXLAN") with Ethernet Virtual Private Network ("EVPN") control plane.

BACKGROUND

Data centers are increasingly used by enterprises for effective collaboration and interaction and to store data and resources. A typical data center network contains myriad network elements, including hosts, load balancers, routers, switches, etc. The network connecting the network elements provides secure user access to data center services and an infrastructure for deployment, interconnection, and aggregation of shared resources as required, including applications, hosts, appliances, and storage. Improving operational efficiency and optimizing utilization of resources in such data centers are some of the challenges facing data center managers. Data center managers want a resilient infrastructure that consistently supports diverse applications and services and protects the applications and services against disruptions. A properly planned and operating data center network provides application and data integrity and optimizes application availability and performance.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

One aspect of the present disclosure provides an example embodiment of a method (referred to herein as a "first method") for programming a Media Access Control ("MAC") address table. The first method may be performed by a first leaf node in a network comprising N leaf nodes, where N is an integer greater than 1. Each leaf node in the network may comprise one or more Virtual Tunnel End Points ("VTEPs") and instantiate a plurality of Virtual Routing and Forwarding elements ("VRFs"). A corresponding core Bridge Domain ("BD") may be assigned to each VRF. The first method may include steps of obtaining information indicating one or more VTEP Affinity Groups (VAGs), each VAG of the one or more VAGs comprising an identification of only one VTEP of the one or more VTEPs per leaf node and obtaining information indicating assignment of each VRF of the plurality of VRFs to one of the one or more VAGs. The first method may also include steps of assigning each VAG of the one or more VAGs to a unique Filtering Identifier ("FID"), thereby generating one or more FIDs, and programming the MAC address table, using FIDs instead of BDs, by populating the MAC address table with a plurality of entries, each entry comprising a unique combination of a FID and a MAC address of a leaf node.

As used herein, the term "leaf node" refers to any network element configures with the functionality of a leaf node as described herein.

In an embodiment, the step of programming may comprise, based on the information indicating assignment of each VRF of the plurality of VRFs to one of the one or more VAGs, grouping VRFs assigned to each VAG into a different VRF subset, thereby generating one or more VRF subsets, and generating one entry for the MAC address table per each VRF subset of the one or more VRF subsets per each leaf node of the N leaf nodes except the first leaf node.

In an embodiment, each entry of the plurality of entries may identify a VTEP that is identified in a VAG that is assigned to a FID of the entry.

In an embodiment, the network may be a Virtual eXtensible Local Area Network ("VXLAN") and the term "VTEP" may refer to a VXLAN Tunnel End Point.

In an embodiment, the first method may further include receiving a routing message (i.e., an advertisement route) from a VRF of the plurality of VRFs on a second leaf node, the routing message comprising an identification of a VTEP for the second leaf node as identified in a VAG to which the VRF is assigned to, and, based on information contained in the routing message, including, in a hardware Forwarding Information Base ("FIB") table of the first leaf node (i.e. programming the FIB of the first leaf node), an Internet Protocol ("IP") route to the VRF on the second leaf node, the IP route identifying a MAC address of the second leaf node in accordance with the MAC address table. In an embodiment, such a routing message may be a MAC/IP Advertisement Route received via Ethernet Virtual Private Network ("EVPN") Border Gateway Protocol ("BGP"), and the identification of the VTEP for the second leaf node may be encoded in a Next Hop field of the routing message.

Another aspect of the present disclosure provides an example embodiment of another method (referred to herein as a "second method") for a first leaf node in a network comprising a plurality of leaf nodes to program a MAC address table. The second method includes receiving a first routing message from a second leaf node, identifying that the first routing message comprises an identification of a VTEP of the second leaf node (i.e., one VTEP comprised within the second leaf node), an identification of a MAC address of the second leaf node, and an indication that the first routing message is independent of any of a plurality of VRFs that may be instantiated on the second leaf node. The second method further includes storing, e.g. in a database and/or in a cloud, the identification of the VTEP derived from the first routing message associated with the identification of the MAC address derived from the first routing message. The second method also includes receiving a second routing message from the second leaf node, identifying that the second routing message comprises an identification of the VTEP of the second leaf node and an identification of a VRF instantiated on the second leaf node, accessing the database to determine that the identification of the VTEP derived from the second routing message is associated with the identification of the MAC derived from the first routing message, and programming the MAC address table of the first leaf node with an entry indicating the identification of the VRF derived from the second routing message, the identification of the VTEP derived from the second routing message, and the identification of the MAC address derived from the first routing message.

Yet another aspect of the present disclosure provides an example embodiment of another method (referred to herein as a "third method") for a second leaf node to provide information enabling the first leaf node to program a MAC address table according to the first or the second method described herein or another other method that the first leaf node may be configured to follow to program its MAC address table. The third method may include transmitting the first routing message and the second routing message as described above.

In an embodiment, each of the first and the second routing messages may comprises an EVPN BGP update message comprising Network Layer Reachability Information ("NLRI"). In such an embodiment, the first routing message may comprise a Route Type field encoding a predefined value indicating that the first routing message comprises the identification of the VTEP and the identification of the MAC address of the second leaf node, and another field, e.g. a Route Distinguisher field, encoding a predefined value indicating that the first routing message is independent of any of the plurality of VRFs instantiated on the second leaf node. The second routing message in such an embodiment may comprise a Route Type field encoding a predefined value indicating that the second routing message comprises a MAC/IP Advertisement Route. The second routing message may also comprise a Next Hop field encoding the identification of the VTEP of the second leaf node.

Since embodiments of the first and the second methods described herein involve programming of a MAC address table or, further programming of an IP route into the FIB table, a functional entity within a network element such as a first leaf node performing embodiments of these methods described herein will be referred to in the following as a "programming logic" of a first leaf node. Since embodiments of the third method described herein involve enabling a first leaf to program a MAC address table, a functional entity within a network element such as a second leaf node performing embodiments of these methods described herein may be referred to as a "programming logic" of a second leaf node.

As will be appreciated by one skilled in the art, aspects of the present disclosure, in particular the functionality of the programming logic of any leaf node described herein, may be embodied as a system, a method or a computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a processor, e.g. a microprocessor, of a computer. Furthermore, aspects of the present disclosure may take the form of a computer program product embodied in one or more computer readable medium(s), preferably non-transitory, having computer readable program code embodied, e.g., stored, thereon. In various embodiments, such a computer program may, for example, be downloaded (updated) to the existing devices and systems (e.g. to the existing network elements such as the existing routers, switches, various control nodes, etc.) or be stored upon manufacturing of these devices and systems.

EXAMPLE EMBODIMENTS

Basics of VXLAN with EVPN Control Plane

Overlay networks in general, and Internet protocol ("IP") overlay networks in particular, are gaining popularity for providing virtual machine ("VM") mobility over Layer 3 ("L3") networks. Virtual eXtensible Local Area Network ("VXLAN") is a technique for providing a Layer 2 ("L2") overlay on an L3 network. In particular, VXLAN is used to address the need for overlay networks within virtualized data centers accommodating multiple tenants. In such overlay networks, native frames are encapsulated with an outer IP overlay encapsulation, as along with a VXLAN header, and UDP header. In VXLAN, each overlay is referred to as a VXLAN segment. VMs within the same VXLAN segment are within the same L2 domain. Each VXLAN segment is identified by a 24-bit segment identifier ("ID"), referred to as a VXLAN Network Identifier ("VNI"), which identifies virtual network segments for different tenants and allows up to 16M VXLAN segments to coexist within a single administrative domain. The term "VXLAN segment" herein may be used interchangeably with the term "VXLAN overlay network." Additional details are provided in "VXLAN: A Framework for Overlaying Virtualized Layer 2 Networks over Layer 3 Networks" (RFC 7348) (hereinafter "VXLAN RFC"), which is hereby incorporated by reference in its entirety.

A VXLAN tunnel endpoint ("VTEP") is a hardware or software component that performs VXLAN encapsulation and decapsulation. The IP address used by a VTEP as the source address for VXLAN encapsulation is referred to as the VTEP address. A leaf node, such as a Top of Rack (ToR) switch or router, may host one or more VTEPs, depending on its capability. Additional details are provided in RFC 7348, which is hereby incorporated by reference in its entirety.

Ethernet Virtual Private Network ("EVPN") is an L2 Virtual Private Network (L2VPN) solution over IP/MPLS networks. Originally designed for applications such as data center interconnect and business L2VPN services, EVPN is recently considered as a Network Virtualization Overlay (NVO) solution. EVPN BGP has been proposed to be used as a control protocol to distribute tenant system (TS) reachability and underlay tunnel endpoint information. In the proposal, a MAC/IP Advertisement Route is used to advertise reachability to the tenant systems, where the Next Hop field of the route is set to an underlay tunnel endpoint address such as VTEP address. In addition, it has been proposed to advertise the route with a new EVPN BGP extended community attribute called "Router's MAC Extended Community" carrying the router MAC of a router that hosts the underlay tunnel endpoint specified in the Next Hop field. The router MAC is then used as the inner destination MAC of a VXLAN encapsulated packet. Additional details are provided in L2VPN workgroup internet drafts "A Network Virtualization Overlay Solution using EVPN" (draft-ietf-bess-evpn-overlay-00, dated Nov. 10, 2014) and "Integrated Routing and Bridging in EVPN" (draft-ietf-bess-evpn-inter-subnet-forwarding-00, dated Nov. 11, 2014), each of which is hereby incorporated by reference in its entirety.

Dynamic Fabric Automation ("DFA"), also referred to as "Vinci," is one exemplary architecture for facilitating data center networking. The physical topology of DFA is based on a two-tier fat tree, also known as a Clos network, in which a plurality of leaf nodes (which may be implemented as Top of Rack ("ToR") switches or routers) connects to each of a plurality of spine nodes (implemented as switches or routers) and vice versa. To support data forwarding, IP fabric is used in one embodiment of DFA. While embodiments of the present disclosure are described with reference to DFA, as illustrated with the IP fabrics shown in FIGS. 1 and 2, these embodiments are applicable to a broader scope of any VXLAN-based IP fabric, beyond DFA. In particular, functionality of the leaf nodes 220 and the MAC programming logic 260 described herein is applicable to any IP traffic comprising a plurality of leaf nodes, connected in any network topology, e.g., a topology in the absence of the second tier of the spine nodes 230.

Multitenancy is an important feature for IP fabric. Tenant traffic is either switched or routed over the IP fabric, encapsulated with VXLAN segment IDs. A tenant may be allocated one or more Virtual Local Area Network ("VLAN") on a leaf node to which the virtual machines (VMs) thereof are connected. Each VLAN is associated with a layer 2 ("L2") segment ID, which is used to encapsulate traffic switched over the fabric. In addition, a tenant may be associated with a VRF on the leaf node. The IP packets of a tenant may be forwarded over the IP fabric based on lookups in its VRF. Each VRF is associated with a layer 3 ("L3") segment ID, which is used to encapsulate traffic routed over the fabric.

Figure 1:
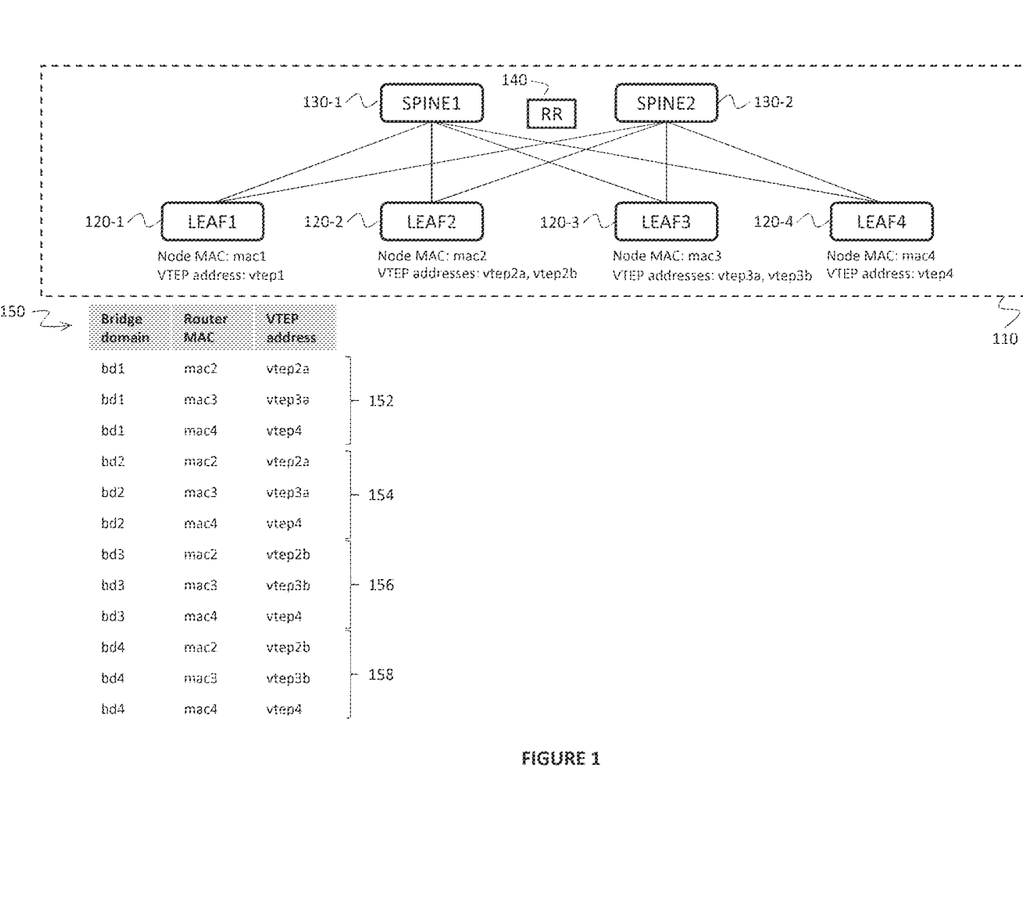
FIG. 1 is a simplified block diagram illustrating an example deployment of an IP fabric.

FIG. 1 provides a simplified block diagram illustrating an example deployment of an IP fabric. FIG. 1 illustrates an underlay fabric 110 comprising a plurality of leaf nodes, shown as four leaf nodes 120-1 through 120-4, each of which may be implemented as a ToR switch located in a rack unit (not shown) that houses one or more network elements, such as e.g. physical servers (not shown).

In one exemplary implementation, each leaf node 120 may be connected to each of a plurality of spine nodes, shown as two spine nodes 130-1 and 130-2, which may be implemented using routers or switches, and is configured to forward communications between the physical servers of the leaf nodes 120, in the rack unit and other network elements. However, discussions herein are applicable to any IP fabric 110 and presence of the spine nodes is entirely optional. For example, without spine nodes, the leaf nodes could be connected through a full mesh topology.

One or more virtual switches and virtual machines ("VMs") (not shown) may be created and run on a physical server connected to each leaf node on top of a hypervisor (not shown). The virtual switches may be configured to manage communications of VMs in particular virtual networks and/or subnetworks ("subnets") and may be embodied by software stored and executed on the corresponding physical server connected to a leaf node, thus performing functions of a physical switch device. Similarly, the VMs may be software stored and executed on the corresponding physical servers connected to the leaf nodes and configured to exchange communications with other VMs via the fabric 110.

Though not illustrated in FIG. 1, a physical server associated with a leaf switch of each leaf node may be housed in a rack unit or "rack." Additional physical servers may also be housed in the rack. Leaf nodes 120 are responsible for managing communications (e.g., routing and forwarding) originating from and destined for physical servers (and virtual machines and virtual switches hosted by the physical servers) in the rack. Hence the term "top-of-rack" (ToR) ascribed to leaf nodes 120. Leaf nodes 120 may be used to provide redundancy and fault-tolerance for communications associated with physical servers, virtual machines and virtual switches in the rack. Thus, leaf node 120-1 is a peer to leaf node 120-2, and vice versa. These leaf nodes are configured to communicate with a network controller unit ("network controller"), not shown in FIG. 1, which is configured to manage communications between leaf nodes in different racks.

It may be appreciated that any number of two or more leaf nodes, any number of zero or more spine nodes, any number of physical servers hosting any number of virtual switches and VMs may be present in the system 110. For simplicity, FIG. 1 is further described with reference to the first leaf node 120-1. However, analogous descriptions are applicable to any other leaf nodes of the system 110.

FIG. 1 provides an exemplary illustration of two spine nodes 130, spine1-2, and four leaf nodes 120, leaf1-4, connected in a Clos network topology. Each of the leaf nodes leaf1-4 has a corresponding node MACs mac1-4, respectively. One VTEP is present in leaf1 and leaf4 each while two VTEPs are in leaf2 and leaf3 each, shown in FIG. 1 as VTEP addresses vtep1 for leaf1, vtep2*a/b* for leaf2, vtep3*a/b* for leaf3 and vtep4 for leaf4. A route reflector ("RR") 140 may establish EVPN BGP adjacencies with each leaf node. A leaf node is configured to pass its TS and VTEP information through BGP to the RR 140, which then reflects the information to other leaf nodes. For the purpose of discussion, consider that there are four VRFs in the overlay network, vrf1-4, which are instantiated in each of the four leaf nodes. In a leaf node, each VRF uses one L3 VNI to forward L3 routed traffic over the network fabric 110. A L3 VNI is mapped to a Bridge Domain (BD) internally (i.e., within each leaf node). Therefore, each VRF has a BD for routed traffic over the network fabric, which is called "core BD." For example, in the leaf node leaf1, VRFs vrf1-4 have core BDs bd1-4, respectively.

When a leaf node receives a MAC/IP Advertisement Route, it needs to program the IP route in a hardware FIB table pointing to an adjacency which contains the remote VTEP's router MAC for L2 rewrite. For post-L3 L2 lookup, it also needs to program that router MAC in its MAC address table to point to the next-hop VTEP. One approach for the programming of the MAC address table is based on allocating a MAC address table entry with the core BD tied to the route's VRF and the router MAC carried in Router's MAC Extended Community as keys and the VTEP address carried in the Next Hop field as content. Table 150 shown in FIG. 1 illustrates such a programming in leaf1. Consider an example that in vrf1, leaf2-4 advertise MAC/IP Advertisement Routes with Next Hop fields of vtep2*a*, vtep3*a* and vtep4, respectively. Consider further that leafs2-4 also advertise their respective router MACs, mac2-4, in Router's MAC Extended Community along with the routes. In such an example, when leaf1 receives the routes, it will program three MAC address table entries, keyed by vrf1's core BD, bd1, and leaf2-4's router MACs, mac2-4 (shown as entries 152). Similarly, leaf1 will program three MAC address table entries allocated for vrf2-4 each—i.e. three entries keyed by vrf2's core BD, bd2, and leaf2-4's router MACs, mac2-4 (shown as entries 154), three entries keyed by vrf3's core BD, bd3, and leaf2-4's router MACs, mac2-4 (shown as entries 156), and three entries keyed by vrf4's core BD, bd4, and leaf2-4's router MACs, mac2-4 (shown as entries 158). Therefore, a total of 12 entries are programmed in the MAC address table 150.

Generally speaking, if there are N leaf nodes and M VRFs in a network, such an approach would require M×(N−1) MAC address table entries in each a leaf node. Since a typical network contains a large number of leaf nodes, e.g. 100 leaf nodes, and a large number of VRFs, e.g. 1000 VRFs, this approach does not scale well in data plane.

Apart from the above scalability issue in data path programming, there is also a scalability issue in control path advertisement. A MAC/IP Advertisement Route is advertised with a router MAC via Router's MAC Extended Community attribute. Given that routes of different VRFs are advertised separately, a router MAC may be advertised repeatedly, once per VRF. Therefore, if there are N leaf nodes and M VRFs in a network, there may be M×(N−1) advertisements of router MACs, even if there are only N router MACs.

In view of the foregoing, at least two issues exist to be considered regarding scalable handling of BGP route information in VXLAN with EVPN control plane as described above. One is an issue in a data plane, namely the issue of how to efficiently utilize route information for the support of a large scale deployment of VXLAN overlay with EVPN control plane. Another is an issue in a control plane, namely the issue of how to cut down the redundant advertisements for better control path scalability. Accordingly, two solutions are described herein, both providing enhancements to the existing handling of BGP route information in VXLAN with EVPN control plane—one for the data plane issue and one for the control plane issue.

Addressing the Issue of Scalability in a Data Plane

Figure 2:
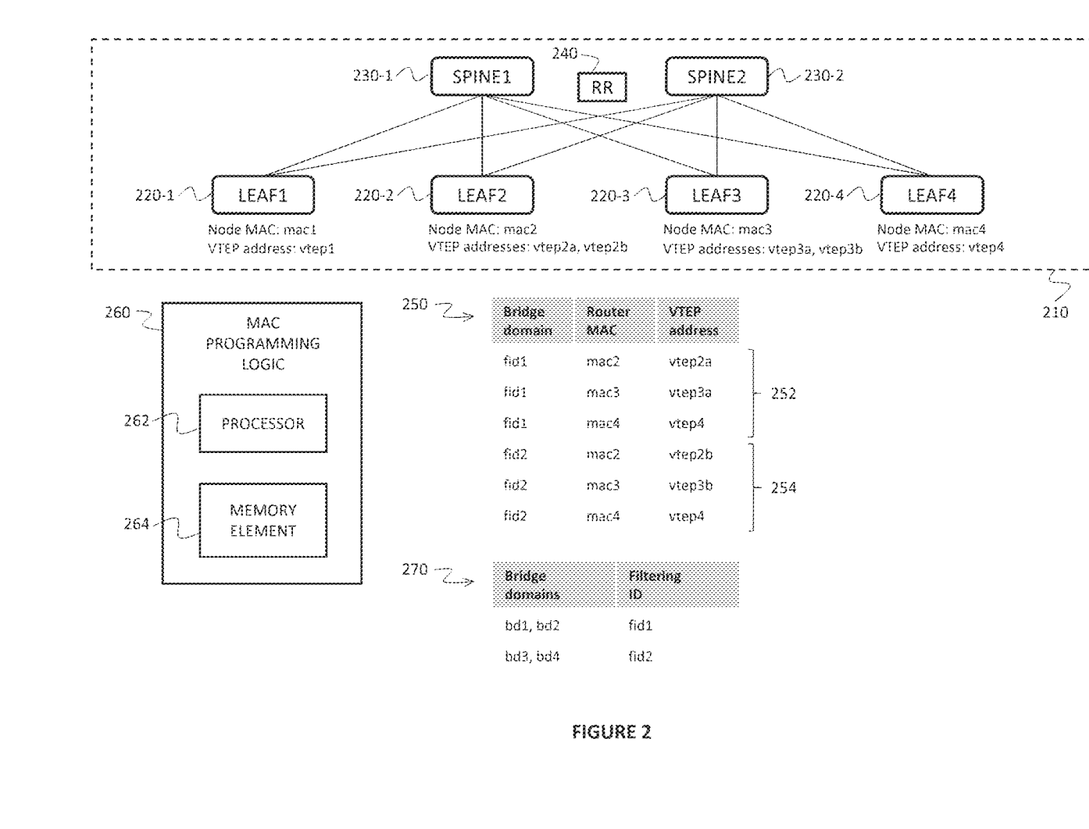
FIG. 2 is a simplified block diagram illustrating an example deployment of an IP fabric, according to an embodiment of the present disclosure.

FIG. 2 is a simplified block diagram illustrating an example deployment of an IP fabric, according to an embodiment of the present disclosure. Similar to FIG. 1, FIG. 2 provides a simplified block diagram illustrating an example deployment of a Vinci IP fabric by illustrating a leaf/spine underlay fabric 210 comprising a router reflector 240, a plurality of leaf nodes, shown as four leaf nodes 220-1 through 220-4, each leaf node connected to each of a plurality of spine nodes, shown as two spine nodes 230-1 and 230-2.

General description of the elements of the fabric 110 provided for FIG. 1, up to the description of programming a MAC address table and programming IP routes in a FIB table, is applicable to the corresponding elements of the fabric 210 illustrated in FIG. 2 and, therefore, in the interests of brevity, is not repeated here. As with the fabric illustrated in FIG. 1, discussions provided with reference to elements shown in FIG. 2 are applicable to any IP fabric 210 and presence of the spine nodes 230 is entirely optional. Programming a MAC address table and programming IP routes in a FIB table for the underlay fabric 210 of FIG. 2 is described below.

In order to facilitate the various operations performed by a leaf node as described herein, each of the leaf nodes 220 includes a programming logic 260 which may comprise at least a processor 262 and a memory element 264.

Figure 3:
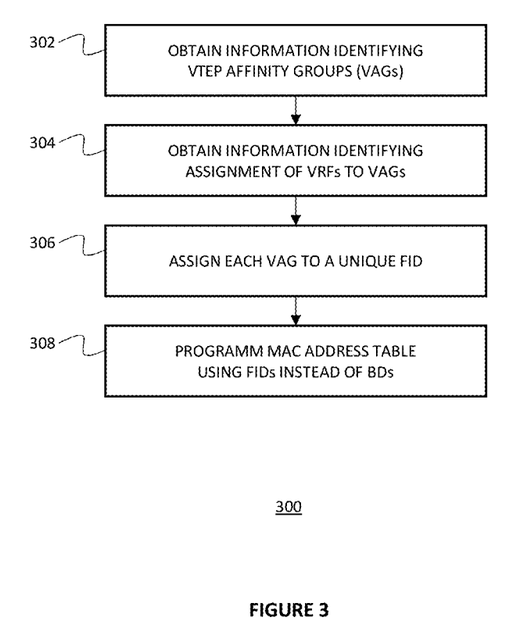
FIG. 3 is a flowchart of method steps illustrating a process of a particular leaf node programming a MAC address table, according to an embodiment of the present disclosure.

FIG. 3 is a flowchart of method steps 300 illustrating a process of a particular leaf node, e.g. the first leaf node leaf1, programming a MAC address table, according to an embodiment of the present disclosure. Referring to FIG. 3, in step 302, the programming logic 260 of a particular leaf node, e.g. the first leaf node leaf1, obtains information indicating one or more VTEP Affinity Groups (VAGs), each VAG comprising an identification of one and only one VTEP per leaf node. Thus, even when a leaf node may comprise multiple VTEPs, such as e.g. leaf 2 and leaf3 illustrated in FIG. 2, each VAG only includes an identification of only one VTEP for leaf2 and only one VTEP for leaf3.

Consider, for example, that two VAGs have been constructed, vag1 and vag2, vag1 identifying VTEPs {vtep1, vtep2a, vtep3a, vtep4} and vag2 identifying VTEPs {vtep1, vtep2b, vtep3b, vtep4}. In various embodiments, however, any number of VAGs may be used. In an embodiment, only a single VAG may be formed. However, multiple VAGs may be beneficial e.g. for load balancing purpose. Multiple VAGs may also be formed for the purpose of isolation of different sets of tenants using different groups of VTEPs. In an embodiment, a network controller, such as e.g. a data center network management (DCNM) station, may construct VAGs and then provide that information to the leaf nodes, e.g. as illustrated with step 302.

Each VRF is assigned to one of the VAGs. A MAC/IP advertisement route in a VRF can only use a VTEP in the VAG in the Next Hop field of a MAC/IP advertisement route.

While each VRF is assigned to only one VAG, a single VAG may have many VRFs assigned to it. Thus, there is a one-to-many relationship between VAGs and VRFs. In an embodiment, a network controller, such as e.g. the DCNM station, may assign VRFs to VAGs and then provide that information to the leaf nodes, e.g. as illustrated with step 304. In step 304, the programming logic 260 of the leaf1 obtains information indicating assignment of each VRF to one of the VAGs.

Consider, for example, that vrf1 and vrf2 are assigned to vag1, while vrf3 and vrf4 are assigned to vag2. A MAC/IP Advertisement Route is advertised with a VTEP in the VAG assigned to its VRF. Therefore, for example, a vrf1 route advertised by leaf2 would have vtep2a encoded in its Next Hop field, while a vrf3 route advertised by leaf3 would have vtep3b as its Next Hop.

Since leaf1 is now informed of which VAGs have been formed (step 302), in step 306, the programming logic 260 of the leaf1 assigns each VAG to a FID that is unique within the leaf1, thereby generating one or more FIDs (the same number of FIDs as VAGs, since there is one-to-one correspondence between FIDs and VAGs).

Originally specified in IEEE 802.1Q, a FID identifies a set of VLANs among which Shared VLAN Learning (SVL) may take place. IEEE 802.1Q provides that, in a MAC address table, FID, instead of VLAN ID, may be used as a key for MAC address lookup. As an extension to VLAN, some Cisco switches, such as e.g. Nexus 5600 BigSur ASIC, further provide that a bridge domain may also be mapped to a FID to support shared learning in hardware. While these examples provide that a VLAN and/or a BD may be mapped to a FID, how exactly the mapping is done is not prescribed.

As a result of the assignment of step 306, core BDs of the VRFs which are assigned the same VAG are mapped into the FID assigned to the VAG. Continuing with the example described in the earlier steps, leaf1 assigns vag1 and vag2 filtering identifiers fid1 and fid2, respectively. Since vrf1 and vrf2 are assigned to vag1, core BDs of vrf1 and vrf2, i.e. bd1 and bd2, are mapped to fid1. Since vrf3 and vrf4 are assigned to vag2, core BDs of vrf3 and vrf4, i.e. bd3 and bd4, are mapped to fid2. Such a BD to FID mapping is illustrated in a table 270 shown in FIG. 2.

Once BD to FID mapping is determined, the programming logic 260 in leaf1 can populate the MAC address table of leaf1 with entries using FID, instead of BD, as a key (step 308). Consider, for example, that leaf2 advertises two routes, one route in vrf1 and the other route in vrf2. When leaf1 receives the advertisement routes, the programming logic 260 will install only one entry in its MAC address table, because bd1 (i.e., the core BD of vrf1) and bd2 (i.e., the core BD of vrf2) are mapped to the same FID, fid1. On the other hand, consider, for example, that leaf2 advertises another route in vrf3. When leaf1 receives that advertisement route, the programming logic 260 in leaf1 will install a new entry in its MAC address table, because bd3 (i.e., the core BD of vrf3) is mapped to a different FID, fid2, and thus cannot share with the previous entry "fid1" as a key.

Thus, programming the MAC address table in leaf1 using FIDs instead of BDs comprises populating the MAC address table in leaf1 with entries each of which comprises a unique combination of a FID and a MAC address of a leaf node. This is illustrated with a MAC address table 250 shown in FIG. 2 for leaf1, for the example described in association with method steps 300. Compared to the MAC address table shown in FIG. 1, the number of entries in the table shown in FIG. 2 is reduced from 12 to 6, where, in comparison with FIG. 1, entries for vrf1 and vrf2 are combined together and shown as entries 252 for fid1 (because fid1 is assigned to vag1 to which vrf1 and vrf2 are assigned to), and entries for vrf3 and vrf4 are combined together and shown as entries 254 for fid2 (because fid2 is assigned to vag2 to which vrf3 and vrf4 are assigned to).

In other words, populating the MAC address table in leaf1 in step 308 may be described as, first, based on the information received in step 302 indicating assignment of each VRF to one of the VAGs, grouping VRFs assigned to each VAG into a different VRF subset (thereby generating one or more VRF subsets), and, second, generating one entry for the MAC address table per each VRF subset per each leaf node of the N leaf nodes except the first leaf node. Continuing with the example described above, such an approach would result in, first, grouping VRFs into 2 subsets (subset 1: vrf 1 and vrf2; subset 2: vrf3 and vrf4), and then generating one entry per subset per leaf node except the first node—i.e. one entry for subset 1 for leaf node leaf2 (the first entry in the table 250), one entry for subset 1 for leaf node leaf3 (the second entry in the table 250), one entry for subset 1 for leaf node leaf4 (the third entry in the table 250), and then another 3 entries for the 3 leaf nodes leaf2-4 for the subset 2.

Generally speaking, if there are N leaf nodes and G VAGs in the network (G being an integer equal to or greater than 1), the method illustrated in FIG. 3 results in G×(N−1) MAC address table entries in a lead node. Given a typically small number of VAGs, e.g. 2, and a large number of VRFs, e.g. 1000, such an approach scales much better than that described in association with FIG. 1.

As a special case, if each leaf node has only one VTEP, only one VAG can be constructed. In this case, the approach according to FIG. 3 would require only (N−1) MAC address table entries, which is the minimal number of entries possible.

Figure 4:
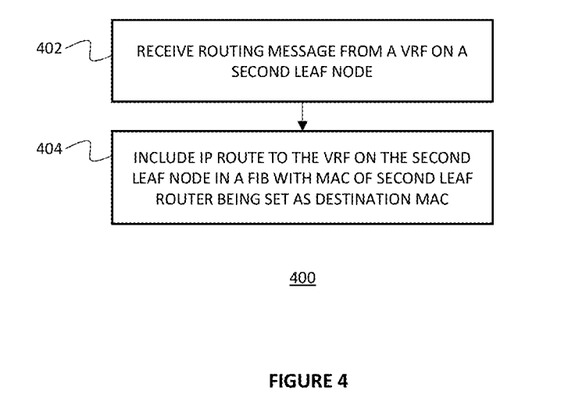
FIG. 4 is a flowchart of method steps illustrating a process of a particular leaf node programming an IP route into its FIB, according to an embodiment of the present disclosure.

FIG. 4 is a flowchart of method steps 400 illustrating a process of a particular leaf node, e.g. the first leaf node leaf1, programming an IP route into its FIB (not shown), according to an embodiment of the present disclosure. Referring to FIG. 4 and continuing with the example described in association with FIG. 3, in step 402, the programming logic 260 of the first leaf node leaf1 receives a MAC/IP advertisement route for a particular VRF on a particular other (i.e., second) leaf node, e.g. from vrf1 on leaf2. In step 404, based on the info received in step 402, the programming logic 260 includes in a FIB table of the leaf1, an IP route to that VRF on the other leaf node, the IP route identifying a MAC address of the second leaf node in accordance with the MAC address table. Continuing with the example described above, this means that the programming logic of leaf1 extracts the VTEP for leaf2 from the advertisement (so leaf1 extracts "vtep2a" because leaf2 has to include that vtep, and not vtep2b, as the Next Hop), obtains MAC address for vtep2a from the VTEP router's MAC Extended Community attribute carried along with the BGP MAC/IP advertisement route for vrf1 on leaf2 (i.e., for vtep2a, the MAC is "mac2"), and then programs the FIB in leaf1 with a route with the destination MAC equal to mac2. In the MAC address table, leaf1 will program an entry with BD/FID and mac2 as a key and vtep2a as content.

In summary, the above-described embodiments of the VTEP affinity approach to scale MAC address table programming in a data path provide enhancements to existing handling of BGP route information in VXLAN with EVPN control plane. As a result, the number of MAC address table entries needed for a large scale deployment of VXLAN with EVPN as control plane may be substantially reduced.

Addressing the Issue of Scalability in a Control Plane

Section 7 of Network Working Group Internet Draft "BGP MPLS Based Ethernet VPN" (draft-ietf-l2vpn-evpn-11, dated Oct. 18, 2014), which is hereby incorporated by reference in its entirety, defines a new BGP Network Layer Reachability Information (NLRI), called "EVPN NLRI." The following format of the EVPN NLRI is proposed: Route Type (1 octet), Length (1 octet), and Route Type specific (variable). The Route Type field defines encoding of the rest of the EVPN NLRI (Route Type specific EVPN NLRI). The Length field indicates the length in octets of the Route Type specific field of EVPN NLRI.

In addition to the four Route Types proposed in this document (Ethernet Auto-Discovery (A-D) route denoted as Route Type "1", MAC/IP advertisement route denoted as Route Type "2", Inclusive Multicast Ethernet Tag Route denoted as Route Type "3", and Ethernet Segment Route denoted as Route Type "4"), embodiments of the present disclosure are based on using a new Route Type of such EVPN NLRI, which Route Type may be called e.g. "VTEP's Router MAC route" (and be denoted e.g. "5"). A VTEP's Router MAC route type specific EVPN NLRI would consist of a VTEP address, the router MAC of the leaf node that hosts the VTEP, and a Route Distinguisher (RD) set to a predefined value, e.g. all zeros, so that it can be advertised in a BGP update independent of VRF. Such a VTEP's Router MAC EVPN NLRI would then be transmitted by a leaf node in combination with one or more MAC/IP advertisement route EVPN NLRIs (not necessarily at the same time) to enable another leaf node to program an entry in the MAC address table, as described below with reference to FIGS. 5 and 6.

Figure 5:
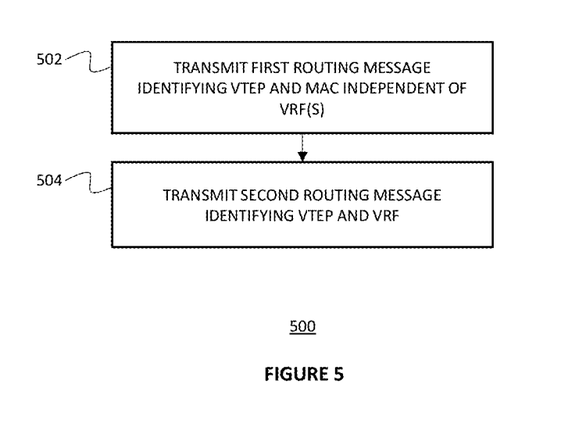
FIG. 5 is a flowchart of method steps illustrating a process of a particular leaf node transmitting routing messages that enable another leaf node to program a MAC address table, according to an embodiment of the present disclosure.
Figure 6:
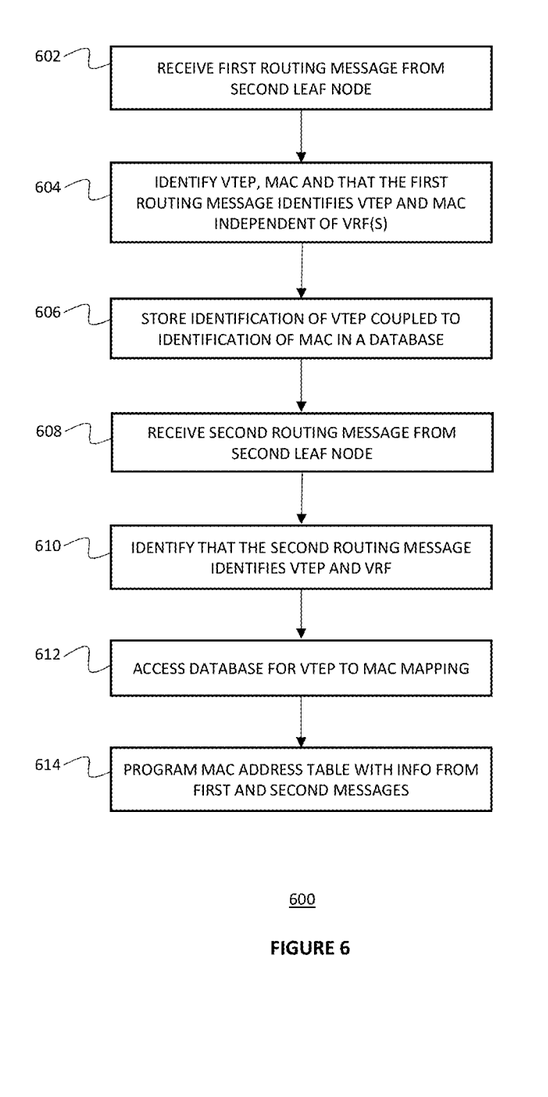
FIG. 6 is a flowchart of method steps illustrating a process of a particular leaf node programming a MAC address table after receiving the routing messages illustrated in FIG. 5, according to an embodiment of the present disclosure.

FIG. 5 is a flowchart of method steps 500 illustrating how the routing messages are transmitted according to an embodiment of the present disclosure, while FIG. 6 is a flowchart of method steps 600 illustrating how a leaf node that has received the messages of FIG. 5 can program its' MAC address table according to an embodiment of the present disclosure. For illustrative purposes, the leaf node that transmits the messages as shown in FIG. 5 is referred to herein as a "second leaf node" while the leaf node that receives the messages and programs its' MAC address table is referred to as a "first leaf node." Steps of FIGS. 5 and 6 are to be understood to be performed by logical entities within or associated with such a second and first leaf nodes, respectively, the logical entities comprising at least a processor and a memory that enable the leaf nodes to perform the steps.

As shown in FIG. 5, the method 500 may begin with a step 502, where the second leaf node transmits a first routing message comprising an identification of one VTEP comprises within the second leaf node, an identification of a MAC address of the second leaf node, and an indication that the first routing message is independent of any VRFs that may be instantiated on the second leaf node. Such a message could be a BGP update message comprising EVPN NLRI with Route Type field encoding a value that indicates that the route type is a VTEP's Router MAC route. The indication that the first routing message is independent of VRFs on the second leaf node may be provided by encoding a particular field within such EVPN NLRI, e.g. a RD field with a predefined value, such as e.g. all zeros.

In step 504, the second leaf node transmits a second routing message comprising an identification of the VTEP of the second leaf node that was identified in the first routing message and an identification of a VRF instantiated on the second leaf node. Such a message could be a BGP update message comprising EVPN NLRI with Route Type field encoding a value that indicates that the route type is a MAC/IP route as defined e.g. in Section 7 of Network Working Group Internet Draft "BGP MPLS Based Ethernet VPN" described above. The VTEP address could be included in the Next Hop field of such a routing message.

As shown in FIG. 6, the method 600 may begin with step 602 where one of the leaf nodes, e.g. the first leaf node, receives the first routing message transmitted by the second leaf node as described in step 502 above.

In step 604, the first leaf node can decode the received first message to obtain the identifications of the VTEP and MAC addresses included in their respective fields of the first routing message as well as to identify that the first routing message was independent of any VRFs on the second leaf node (e.g. by decoding the Route Type value encoded in that field).

In step 606, the first leaf node stores the VTEP and the MAC obtained from the first routing message in a database in such a manner that associated the VTEP address provided in the first routing message to the MAC address provided in the first routing message.

In step 608, the first leaf node receives the second routing message transmitted by the second leaf node as described in step 504 above. Note that, in various embodiments, timing of when the first leaf nodes receives the first and second routing messages may differ—the messages may be received substantially simultaneously, partially overlapping in time (in any order), or sequentially (in any order).

In step 610, the first leaf node identifies that the second routing message comprises a MAC/IP Advertisement route (e.g. by decoding the Route Type value encoded in that field and determining that the Route Type indicates "MAC/IP Advertisement route" update message), and obtains the VTEP and VRF identified in that message. For example, the VTEP can be encoded in the Next Hop field of the second routing message.

In step 612, the first leaf node accesses the database to determine MAC that is associated with the VTEP identified in the second routing message.

In step 614, the first leaf node may then program an entry in its' MAC address table with the VTEP address derived from the second routing message and the MAC address derived from the first routing message. In an embodiment when the MAC address table is programmed using BD's and MAC addresses as keys (e.g., the implementation described with reference to FIG. 1), such an entry may include an identification of the VRF derived from the second routing message by indicating a core BD assigned to that VRF (e.g. as illustrated with any one of the entries shown in the table 150). In an embodiment when the MAC address table is programmed using FID's and MAC addresses as keys (e.g., the implementation described with reference to FIG. 2, however other implementations using FID/MAC combination as keys may be used), such an entry may include an identification of the VRF derived from the second routing message by indicating the node-unique FID associated with that VRF (e.g. as illustrated with any one of the entries shown in the table 250).

The first leaf node may then install it's FIB based on the information contained in the first and second routing messages, e.g. by including in the FIB an IP route to the VRF on the second leaf node, the IP route identifying a MAC address of the second leaf node in accordance with the MAC address table entry programmed in step 614.

Consider that e.g. leaf2 advertises a route in vrf1 using EVPN NLRI. To do so, leaf2 will first generate and transmit a BGP update message (i.e., the advertisement of step 502 above) that comprises EVPN NLRI with Route Type field encoding a value that indicates that the route type is a VTEP's Router MAC route and with the RD field encoding a predetermined value (e.g. all zeros) indicating that the advertisement is independent of a particular VRF within leaf2. When another leaf node, e.g. leaf1, receives such an advertisement (step 602 above), the node (e.g. programming logic within the node) processes the advertisement to identify and store the mapping of VTEP address and router MAC carried in the message in a database (steps 604, 606 above). Furthermore, e.g. leaf2 will generate and transmit another BGP update message (i.e., the advertisement of step 504 above) that comprises EVPN NLRI with Route Type field indicating that this update message is a MAC/IP advertisement route. When another leaf node, e.g. leaf1, receives such an advertisement (step 608 above), the node (e.g. programming logic within the node) processes the advertisement to install entries in the MAC address table of the node (steps 610, 612, 614 above). In particular, the programming logic of leaf1 will examine the other BGP update message to determine that the Route Type field encodes a value indicating that the received EVPN NLRI is of MAC/IP advertisement route type and determine the VTEP address encoded in the Next Hop field of the message (step 610 above). Continuing with the example illustrated in FIG. 1, leaf1 will determine that the address vtep2a is encoded in the Next Hop field of the routing message (because vrf1 uses vtep2a). In the next step, the programming logic of leaf1 will derive the MAC address of leaf2 (i.e., mac2) based on the determined VTEP (i.e., vtep2a) and the previously received mapping of VTEP address, vtep2a, and router MAC, mac2, stored in the database (step 612 above). After that, the programming logic of leaf1 will install an entry in the MAC address table of leaf1 (step 614 above). In the implementation shown in FIG. 1, such an entry would be the entry (of the table 150) containing bd1 (i.e., the core BD associated with vrf1) and the router MAC mac2 as the keys. On the other hand, in the implementation shown in FIG. 2, such an entry would be the entry (of the table 250) containing fid1 (i.e., the FID assigned to vrf1) and the router MAC mac2 as the keys. The content is the same in both of these entries of FIGS. 1 and 2, i.e. the VTEP address vtep2.

Using such a new Route Type of EVPN NLRI, a MAC/IP Advertisement Route can be advertised in a manner that avoids advertising a router MAC via Router's MAC Extended Community. The reason is that the router MAC can be derived based the VTEP address already contained in route's Next Hop field and the mapping advertised in a VTEP's router MAC route. With such an approach, if there are N leaf nodes and V VTEPs per leaf node, using the new Route Type described herein requires only V×N advertisements of router MACs. Given a small number of VTEPs per leaf, e.g. 2, and a typically much larger number of VRFs, e.g. 1000, such an approach scales much better than what is originally specified in Section 5.1.1 of L2VPN Workgroup Internet Draft "Integrated Routing and Bridging in EVPN" described above.

In summary, the above-described embodiments of the new route type (VTEP's Router MAC route) for the EVPN NLRI to scale router MAC advertisement in control path provide enhancements to existing handling of BGP route information in VXLAN with EVPN control plane. As a result, the number of router MAC advertisements needed for a large scale deployment of VXLAN with EVPN as control plane may be substantially reduced.

Variations and Implementations

Within the context of the disclosure, a network used herein represents a series of points, nodes, or network elements of interconnected communication paths for receiving and transmitting packets of information that propagate through a communication system. A network offers communicative interface between sources and/or hosts, and may be any local area network (LAN), wireless local area network (WLAN), metropolitan area network (MAN), Intranet, Extranet, Internet, WAN, virtual private network (VPN), or any other appropriate architecture or system that facilitates communications in a network environment depending on the network topology. A network can comprise any number of hardware or software elements coupled to (and in communication with) each other through a communications medium.

In one particular instance, the architecture of the present disclosure can be associated with a service provider deployment. In other examples, the architecture of the present disclosure would be equally applicable to other communication environments, such as an enterprise wide area network (WAN) deployment. The architecture of the present disclosure may include a configuration capable of transmission control protocol/internet protocol (TCP/IP) communications for the transmission and/or reception of packets in a network.

As used herein in this Specification, the term 'network element' is meant to encompass any of the aforementioned elements, as well as servers (physical or virtually implemented on physical hardware), machines (physical or virtually implemented on physical hardware), end user devices, routers, switches, cable boxes, gateways, bridges, load balancers, firewalls, inline service nodes, proxies, processors, modules, or any other suitable device, component, element, proprietary appliance, or object operable to exchange, receive, and transmit information in a network environment. These network elements may include any suitable hardware, software, components, modules, interfaces, or objects that facilitate operations thereof related to scalable handling of BGP route information in VXLAN with EVPN control plane. This may be inclusive of appropriate algorithms and communication protocols that allow for the effective exchange of data or information.

In one implementation, leaf nodes described herein may include software to achieve (or to foster) the functions discussed herein for scalable handling of BGP route information in VXLAN with EVPN control plane where the software is executed on one or more processors to carry out the functions. This could include the implementation of instances of programming logic and/or any other suitable element that would foster the activities discussed herein. Additionally, each of the leaf nodes can have an internal structure (e.g., a processor, a memory element, etc.) to facilitate some of the operations described herein. In other embodiments, these functions for scalable handling of BGP route information in VXLAN with EVPN control plane may be executed externally to the leaf nodes, or included in some other network element to achieve the intended functionality. Alternatively, leaf nodes may include software (or reciprocating software) that can coordinate with other network elements in order to achieve the functions related to scalable handling of BGP route information in VXLAN with EVPN control plane described herein. In still other embodiments, one or several devices may include any suitable algorithms, hardware, software, components, modules, interfaces, or objects that facilitate the operations thereof.

In certain example implementations, functions related to scalable handling of BGP route information in VXLAN with EVPN control plane outlined herein may be implemented by logic encoded in one or more non-transitory, tangible media (e.g., embedded logic provided in an application specific integrated circuit [ASIC], digital signal processor [DSP] instructions, software [potentially inclusive of object code and source code] to be executed by one or more processors, or other similar machine, etc.). In some of these instances, one or more memory elements can store data used for the operations described herein. This includes the memory element being able to store instructions (e.g., software, code, etc.) that are executed to carry out the activities described in this Specification. The memory element is further configured to store databases such as mapping databases to enable functions disclosed herein. The processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, etc.) can include memory elements for storing information to be used in achieving scalable handling of BGP route information in VXLAN with EVPN control plane, as outlined herein. Additionally, each of these devices may include a processor that can execute software or an algorithm to perform the scalable handling of BGP route information in VXLAN with EVPN control plane as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Additionally, it should be noted that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that the systems described herein are readily scalable and, further, can accommodate a large number of components, as well as more complicated/sophisticated arrangements and configurations. Accordingly, the examples provided should not limit the scope or inhibit the broad techniques of scalable handling of BGP route information in VXLAN with EVPN control plane, as potentially applied to a myriad of other architectures.

It is also important to note that the steps in the FIGS. 3-6 illustrate only some of the possible scenarios that may be executed by, or within, the leaf nodes described herein. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by the leaf nodes in that any suitable arrangements, chronologies, configurations, and timing mechanisms may be provided without departing from the teachings of the present disclosure.

It should also be noted that many of the previous discussions may imply a single client-server relationship. In reality, there is a multitude of servers in the delivery tier in certain implementations of the present disclosure. Moreover, the present disclosure can readily be extended to apply to intervening servers further upstream in the architecture, though this is not necessarily correlated to the 'm' clients that are passing through the 'n' servers. Any such permutations, scaling, and configurations are clearly within the broad scope of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Although the claims are presented in single dependency format in the style used before the USPTO, it should be understood that any claim can depend on and be combined with any preceding claim of the same type unless that is clearly technically infeasible.

What is claimed is:

1. A method for a first leaf node in a network to program a Media Access Control (MAC) address table, the method comprising:
obtaining information identifying one or more Virtual Tunnel End Point (VTEP) Affinity Groups (VAGs), where the network comprises two or more leaf nodes, each leaf node comprises one or more VTEPs and at least one leaf node of the two or more leaf nodes comprises two or more VTEPs, and each VAG comprises an identification of only one VTEP per leaf node;
assigning each VAG of the one or more VAGs to a unique Filtering Identifier (FID), thereby generating one or more FIDs; and
populating the MAC address table with a plurality of entries, where each entry of the plurality of entries comprises a unique combination of a FID of the one or more FIDs and a MAC address of a leaf node.

2. The method according to claim 1, further comprising obtaining information identifying assignment of each Virtual Routing and Forwarding element (VRF) of a plurality of VRFs instantiated on each leaf node to one of the one or more VAGs, wherein populating the MAC address table comprises:
based on the information indicating assignment of each VRF of the plurality of VRFs to one of the one or more VAGs, grouping VRFs assigned to each VAG into a different VRF subset, thereby generating one or more VRF subsets, and
generating one entry for the MAC address table per each VRF subset of the one or more VRF subsets per each leaf node of the N leaf nodes except the first leaf node.

3. The method according to claim 1, wherein each entry of the plurality of entries identifies a VTEP that is identified in a VAG that is assigned to a FID of the entry.

4. The method according to claim 1, wherein the network is a Virtual eXtensible Local Area Network ("VXLAN").

5. The method according to claim 1, further comprising:
obtaining information identifying assignment of each Virtual Routing and Forwarding element (VRF) of a plurality of VRFs instantiated on each leaf node to one of the one or more VAGs;
receiving a routing message from a VRF of the plurality of VRFs on a second leaf node, the routing message comprising an identification of a VTEP for the second leaf node as identified in a VAG to which the VRF is assigned to; and
based on information contained in the routing message, including, in a Forwarding Information Base ("FIB") table of the first leaf node, an Internet Protocol ("IP") route to the VRF on the second leaf node, the IP route identifying a MAC address of the second leaf node in accordance with the MAC address table.

6. The method according to claim 5, wherein the routing message comprises a MAC/IP Advertisement Route.

7. The method according to claim 5, wherein the routing message is received via Ethernet Virtual Private Network ("EVPN") Border Gateway Protocol ("BGP") and the identification of the VTEP for the second leaf node is encoded in a Next Hop field of the routing message.

8. One or more non-transitory computer readable storage media encoded with software comprising computer executable instructions and, when the software is executed, operable to carry out a method for a first leaf node in a network to program a Media Access Control (MAC) address table, the method comprising:
- obtaining information identifying one or more Virtual Tunnel End Point (VTEP) Affinity Groups (VAGs), where the network comprises two or more leaf nodes, each leaf node comprises one or more VTEPs and at least one leaf node of the two or more leaf nodes comprises two or more VTEPs, and each VAG comprises an identification of only one VTEP per leaf node;
- assigning each VAG of the one or more VAGs to a unique Filtering Identifier (FID), thereby generating one or more FIDs; and
- populating the MAC address table with a plurality of entries, where each entry of the plurality of entries comprises a unique combination of a FID of the one or more FIDs and a MAC address of a leaf node.

9. The one or more non-transitory computer readable storage media according to claim 8, the method further comprising obtaining information identifying assignment of each Virtual Routing and Forwarding element (VRF) of a plurality of VRFs instantiated on each leaf node to one of the one or more VAGs, wherein populating the MAC address table comprises:
- based on the information indicating assignment of each VRF of the plurality of VRFs to one of the one or more VAGs, grouping VRFs assigned to each VAG into a different VRF subset, thereby generating one or more VRF subsets and
- generating one entry for the MAC address table per each VRF subset of the one or more VRF subsets per each leaf node of the N leaf nodes except the first leaf node.

10. The one or more non-transitory computer readable storage media according to claim 8, wherein each entry of the plurality of entries identifies a VTEP that is identified in a VAG that is assigned to a FID of the entry.

11. The one or more non-transitory computer readable storage media according to claim 8, wherein the method further comprises:
- obtaining information identifying assignment of each Virtual Routing and Forwarding element (VRF) of a plurality of VRFs instantiated on each leaf node to one of the one or more VAGs;
- receiving a routing message from a VRF of the plurality of VRFs on a second leaf node, the routing message comprising an identification of a VTEP for the second leaf node as identified in a VAG to which the VRF is assigned to; and
- based on information contained in the routing message, including, in a Forwarding Information Base ("FIB") table of the first leaf node, an Internet Protocol ("IP") route to the VRF on the second leaf node, the IP route identifying a MAC address of the second leaf node in accordance with the MAC address table.

12. The one or more non-transitory computer readable storage media according to claim 11, wherein the routing message comprises a MAC/IP Advertisement Route and is received via Ethernet Virtual Private Network ("EVPN") Border Gateway Protocol ("BGP"), and the identification of the VTEP for the second leaf node is encoded in a Next Hop field of the routing message.

13. A system for a first leaf node in a network to program a Media Access Control (MAC) address table, the system comprising:
- at least one memory configured to store computer executable instructions, and
- at least one processor coupled to the at least one memory and configured, when executing the instructions, to:
  - obtain information identifying one or more Virtual Tunnel End Point (VTEP) Affinity Groups (VAGs), where the network comprises two or more leaf nodes, each leaf node comprises one or more VTEPs and at least one leaf node of the two or more leaf nodes comprises two or more VTEPs, and each VAG comprises an identification of only one VTEP per leaf node;
  - assign each VAG of the one or more VAGs to a unique Filtering Identifier (FID), thereby generating one or more FIDs; and
  - populate the MAC address table with a plurality of entries, where each entry of the plurality of entries comprises a unique combination of a FID of the one or more FIDs and a MAC address of a leaf node.

14. The system according to claim 13, wherein the at least one processor is further configured to obtain information identifying assignment of each Virtual Routing and Forwarding element (VRF) of a plurality of VRFs instantiated on each leaf node to one of the one or more VAGs, and wherein populating the MAC address table comprises:
- based on the information indicating assignment of each VRF of the plurality of VRFs to one of the one or more VAGs, grouping VRFs assigned to each VAG into a different VRF subset, thereby generating one or more VRF subsets, and
- generating one entry for the MAC address table per each VRF subset of the one or more VRF subsets per each leaf node of the N leaf nodes except the first leaf node.

15. The system according to claim 13, wherein each entry of the plurality of entries identifies a VTEP that is identified in a VAG that is assigned to a FID of the entry.

16. The system according to claim 13, wherein the network is a Virtual eXtensible Local Area Network ("VXLAN").

17. The system according to claim 13, wherein the at least one processor is further configured to:
- obtain information identifying assignment of each Virtual Routing and Forwarding element (VRF) of a plurality of VRFs instantiated on each leaf node to one of the one or more VAGs;
- receive a routing message from a VRF of the plurality of VRFs on a second leaf node, the routing message comprising an identification of a VTEP for the second leaf node as identified in a VAG to which the VRF is assigned to; and
- based on information contained in the routing message, include, in a Forwarding Information Base ("FIB") table of the first leaf node, an Internet Protocol ("IP") route to the VRF on the second leaf node, the IP route identifying a MAC address of the second leaf node in accordance with the MAC address table.

18. The system according to claim 17, wherein the routing message is received via Ethernet Virtual Private Network ("EVPN") Border Gateway Protocol ("BGP") and the identification of the VTEP for the second leaf node is encoded in a Next Hop field of the routing message.

19. The method according to claim 1, further comprising:
obtaining information identifying assignment of each Virtual Routing and Forwarding element (VRF) of a plurality of VRFs instantiated on each leaf node to one of the one or more VAGs,
wherein each VRF comprises a corresponding core Bridge Domain (BD) assigned thereto and wherein the MAC address table is populated using FIDS instead of BDs.

* * * * *